United States Patent [19]
Hong et al.

[11] Patent Number: 5,276,570
[45] Date of Patent: Jan. 4, 1994

[54] X-DISTANCE COMPENSATING CIRCUIT FOR ADJUSTING HEAD-SWITCHING TIME BY CONTROLLING THE SYNCHRONIZATION OF RECORD AND PLAYBACK CONTROL PULSES TO/FROM A MAGNETIC TAPE OF A MAGNETIC RECORDING/REPRODUCING APPARATUS

[75] Inventors: Kwon-pyo Hong, Euiwang; Seung-ryeol Choi, Suwon, both of Rep. of Korea

[73] Assignee: Samsung Electronics Co., Ltd., Kyunggi-do, Rep. of Korea

[21] Appl. No.: 633,387

[22] Filed: Dec. 31, 1990

[30] Foreign Application Priority Data

Dec. 31, 1989 [KR] Rep. of Korea .................... 89-20744

[51] Int. Cl.⁵ .................................. G11B 15/52
[52] U.S. Cl. .................. 360/73.11; 360/70; 360/71; 360/73.12; 360/109
[58] Field of Search ............ 360/70, 71, 73.11, 73.12, 360/109

[56] References Cited
U.S. PATENT DOCUMENTS

| | | | |
|---|---|---|---|
| 4,796,103 | 1/1989 | Tokuyama | 360/70 |
| 5,119,246 | 6/1992 | Tomitaka | 360/70 |
| 5,177,647 | 1/1993 | Takayanagi | 360/70 |

Primary Examiner—David L. Robertson
Attorney, Agent, or Firm—Cushman, Darby & Cushman

[57] ABSTRACT

A magnetic recording/reproducing apparatus without a need to adjust what is known as X-distance of an Audio/Control head. In one embodiment, the apparatus comprises a reference pulse generator, a delay control pulses generator, and a first and second delay circuits. The apparatus compares the phase of a reproduced control pulse with that of a generated reference pulse and phase-shifts the reproduced control pulse in order to synchronize both pulses. By synchronizing the pulses, the apparatus compensates for the deviation of the X-distance. Another embodiment may be implemented using a microprocessor.

10 Claims, 10 Drawing Sheets

FIG. 1 (PRIOR ART)
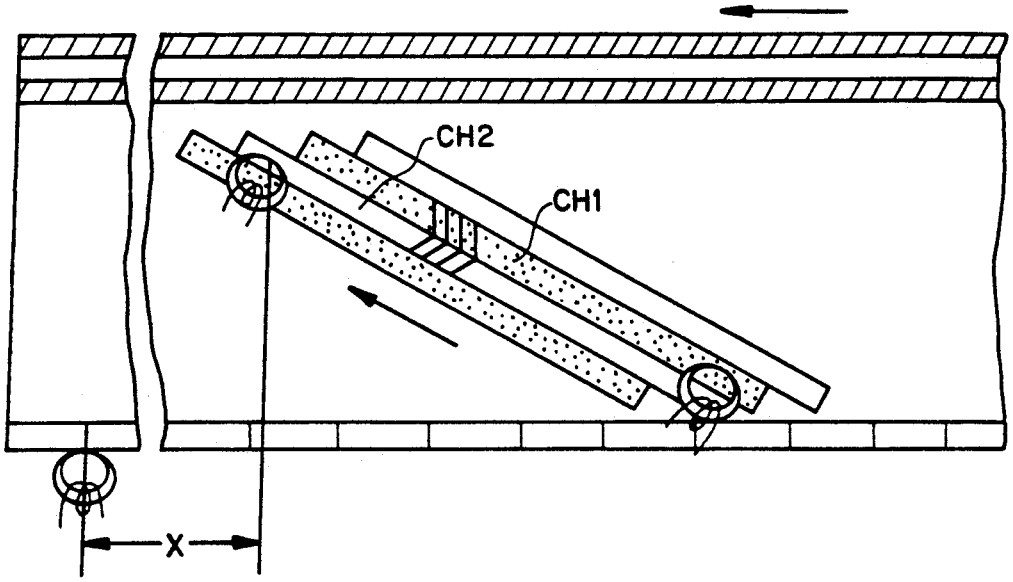
FIG. 2A (PRIOR ART)
FIG. 2B (PRIOR ART)
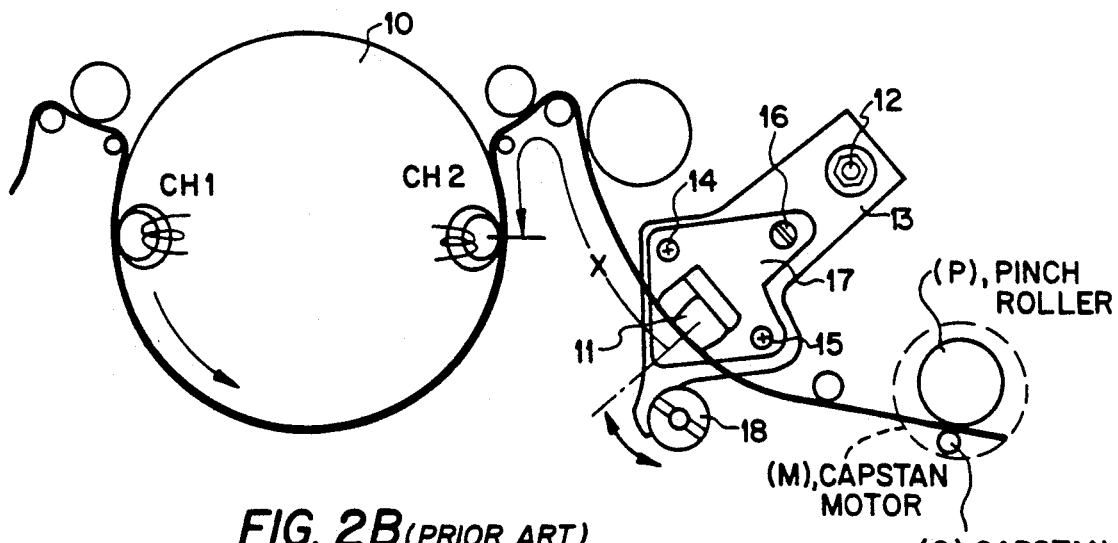
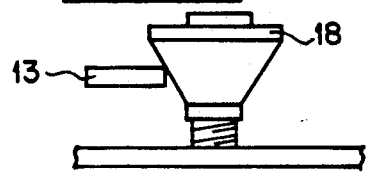

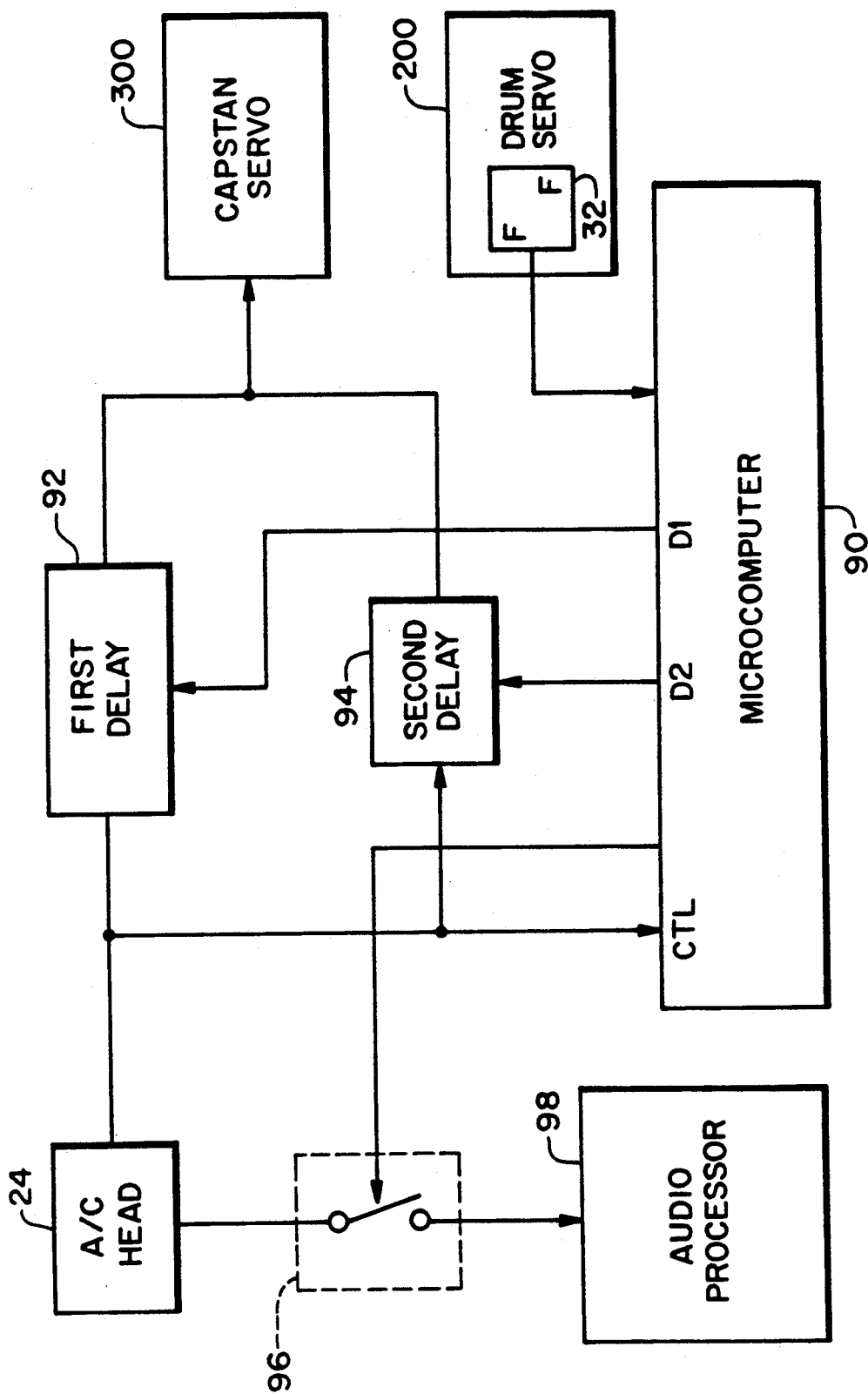

X-DISTANCE COMPENSATING CIRCUIT FOR ADJUSTING HEAD-SWITCHING TIME BY CONTROLLING THE SYNCHRONIZATION OF RECORD AND PLAYBACK CONTROL PULSES TO/FROM A MAGNETIC TAPE OF A MAGNETIC RECORDING/REPRODUCING APPARATUS

BACKGROUND OF THE INVENTION

The present invention relates to a magnetic recording/reproducing apparatus in which adjustment of what may be called X-distance of an Audio/Control (A/C) head, to be described hereinafter, is unnecessary.

In a conventional magnetic recording/reproducing apparatus of rotating head type, a rotating head scans video tracks of a magnetic tape and records video signals thereonto. During a recording, control pulses containing position information for recording tracks are recorded onto a lower track of the tape, and audio signals onto an upper track. Video tracks are slanted with respect to the direction of the tape advancing at a constant rate.

FIG. 1 shows a recording pattern diagram of a magnetic tape for a conventional magnetic recording/reproducing device such as a VHS-type video tape recorder (VTR). When video signals are reproduced from a VHS-type magnetic tape, the VTR's internal drum and capstan servos operate in response to control pulses recorded onto the tape. Without the control pulses, VTR's rotating head cannot precisely track the tape's recordings.

An accurate reading of the control pulses depends on the above-mentioned X-distance of an A/C head, shown in FIG. 2A as the tape length from the falling edge of tape loaded drum 10 (i.e., from the position of the CH-2 head) to the centerline of A/C head 11. The X-distance, also shown in FIG. 1, is regulated to be about 79.244 mm so that control pulses will occur at 6.5 H±0.5 H off from a rising edge of vertical synchronizing signal recorded on the CH-1 track. One unit of H is equal to 63.5 microseconds.

In order to control X-distance, as shown in FIG. 2A, A/C head 11 is secured to A/C head base 17, which is mounted to A/C head base holder 13 by azimuth adjusting screws 14 and 15 and tilt adjust screw 16. A/C head base 17 can be adjusted vertically and transversely. Furthermore, A/C head base holder 13 is supported by rotating shaft 12. Because the holder 13 can rotate about shaft 12, adjusting the height of a cone screw 18 moves holder 13 in transverse direction. If cone screw 18 rotates clockwise, then head of screw 18 will move down and an inclined surface underneath the head will push holder 13 closer to the CH-2 head. This will shorten X-distance of A/C head 11. Conversely, rotating screw 18 counter-clockwise will lengthen X-distance.

The above-mentioned X-distance adjusting design is complex and causes difficulty in constructing small VTR decks. In addition, VTR decks built in accordance with the above design require complex tune-ups.

SUMMARY OF THE INVENTION

It is an object of the present invention to provide a magnetic recording/reproducing apparatus in which an adjustment of X-distance of an A/C head is unnecessary.

It is another object of the present invention to provide a magnetic recording/reproducing apparatus with fewer parts for an A/C head than those of a conventional magnetic recording/reproducing apparatus, to allow designs of VTR decks smaller than those of conventional VTR decks.

It is yet another object of the present invention to provide magnetic recording/reproducing apparatus wherein a circuit compensates for the required adjustment of X-distance of an A/C head.

The present invention includes:

a circuit for generating reference pulses corresponding to a nominal X-distance (upon receiving a signal (i.e., head switching pulses) from the drum servo system after the drum servo system has stabilized;

first delaying circuit for delaying reproduced control pulses for a prescribed length of time;

a delay control pulses generating circuit for generating delay control pulses corresponding to a delay time by comparing the reference pulses with the reproduced control pulses delayed by the first delaying circuit; and a second delaying circuit for delaying the reproduced control pulses in accordance with the delay control pulses.

BRIEF DESCRIPTION OF THE DRAWINGS

The above and other objects and advantages of this invention will become more apparent and more readily appreciated from the following detailed description of the presently preferred exemplary embodiments of the invention, taken in conjunction with the accompanying drawings, of which:

FIG. 1 (PRIOR ART) is a recording pattern diagram for a magnetic tape of a conventional magnetic recording/reproducing apparatus with two head type drum assembly.

FIG. 2A (PRIOR ART) is a schematic diagram of a tape advancing system of the apparatus in FIG. 1.

FIG. 2B (PRIOR ART) is an enlarged side view showing the cone screw of the system in FIG. 2A.

FIG. 9 is a circuit block diagram of an X-distance compensating circuit of the magnetic recording/reproducing apparatus of a second embodiment of the present invention.

DETAILED DESCRIPTION OF THE PRESENTLY PREFERRED EXEMPLARY EMBODIMENTS

Figure 3:
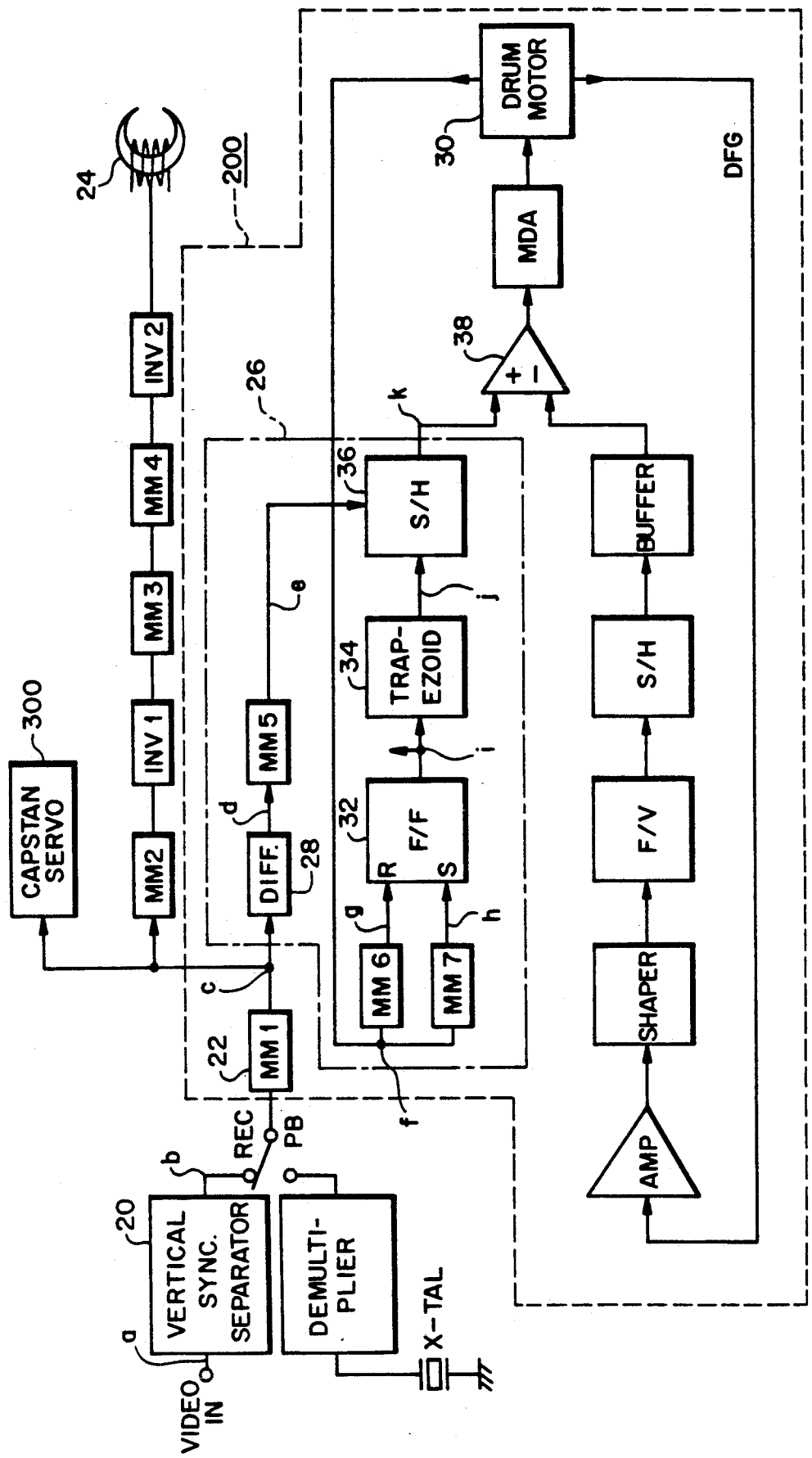
FIG. 3 is a detailed circuit block diagram showing a conventional drum servo system of a magnetic recording/reproducing apparatus.
Figure 5:
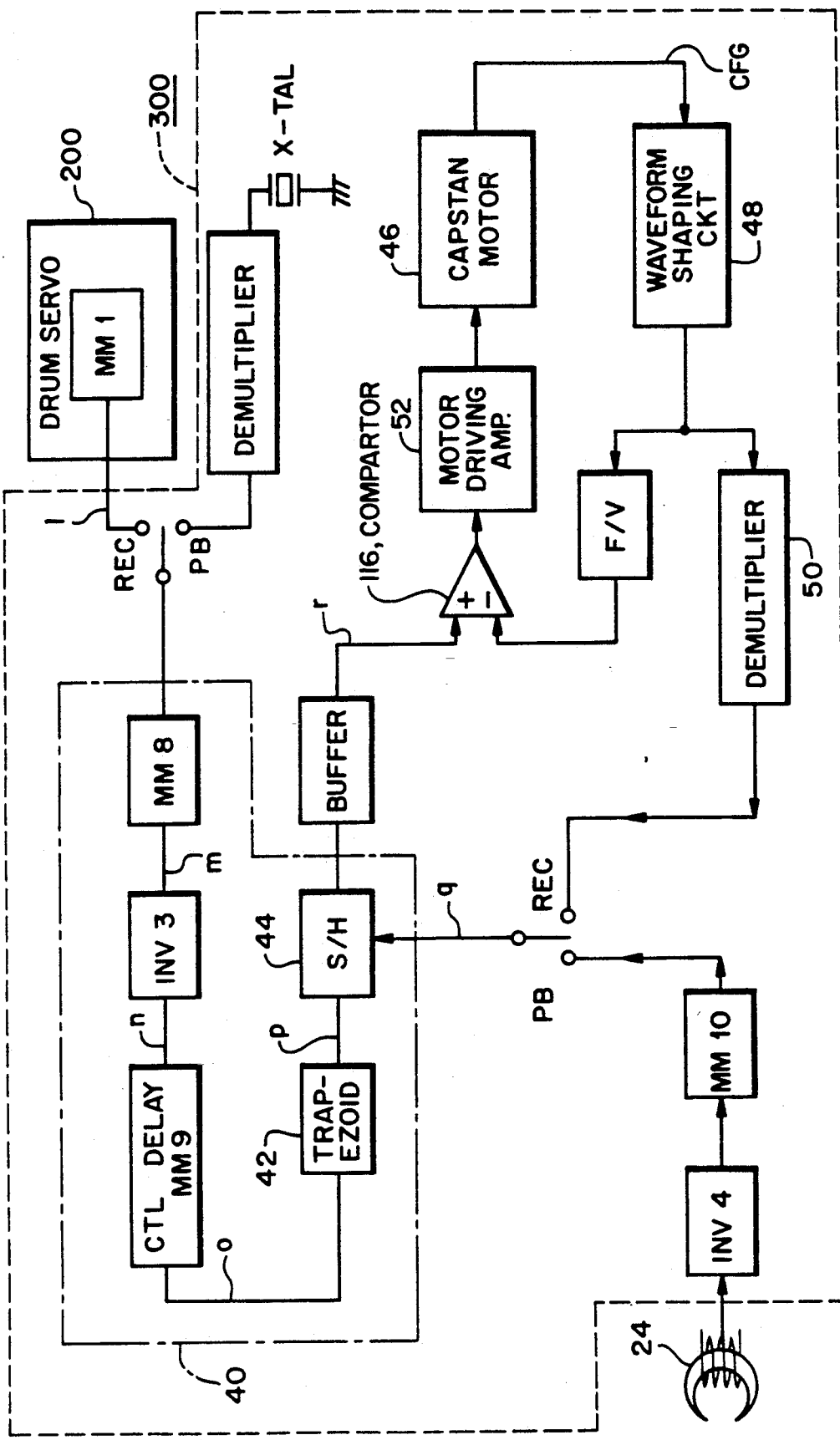
FIG. 5 is a detailed block diagram showing a conventional capstan servo system of a magnetic recording/reproducing apparatus.

The present invention (FIG. 7) comprises three major groups of circuitry: drum servo system corresponding substantially to the conventional drum servo system 200 shown in FIG. 3, capstan servo system 300' corresponding substantially to the capstan servo system 300 shown in FIG. 5, and an X-distance compensating circuit of the magnetic recording/reproducing apparatus. The whole system may operate in either a recording mode or a playback mode.

Figure 7:
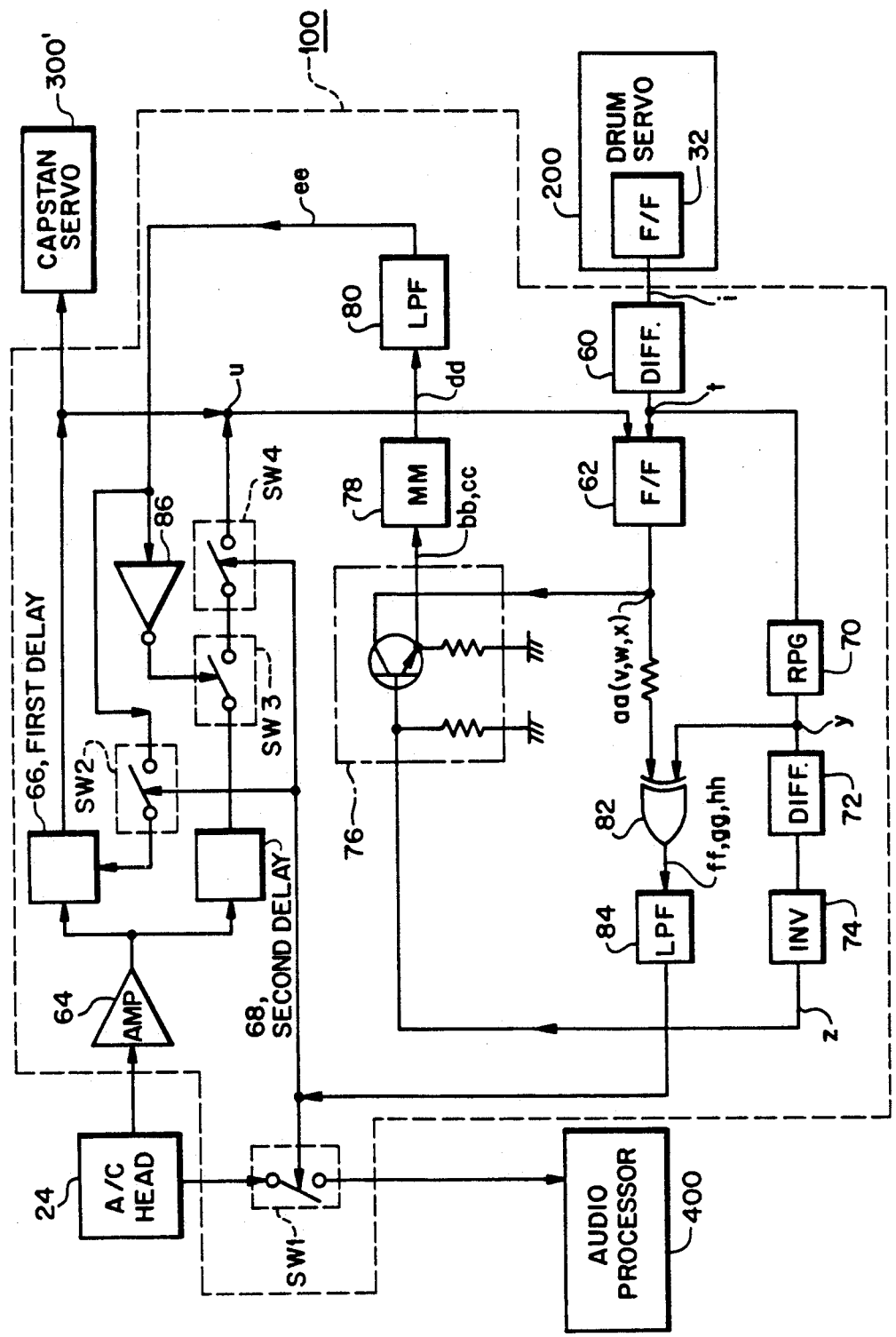
FIG. 7 is a circuit block diagram of an X-distance compensating circuit of the magnetic recording/reproducing apparatus of a first embodiment of the present invention.

The combination of A/C head 24, inverter INV4 and monostable multivibrator MM10 in the conventional capstan servo system 300 shown in FIG. 5 is slightly modified as a new combination of A/C head 24, amplifier 64 and first delay 66 in FIG. 7.

FIG. 3 is a block diagram of drum servo system 200 shown in (FIG. 7) for a magnetic recording/reproducing apparatus according to a first embodiment of the present invention.

Drum servo system 200 can be separated largely into two parts. The first part feeds input signals to A/C head 24, and the second part controls the speed of drum motor 30 via a feedback circuitry.

Figure 4:
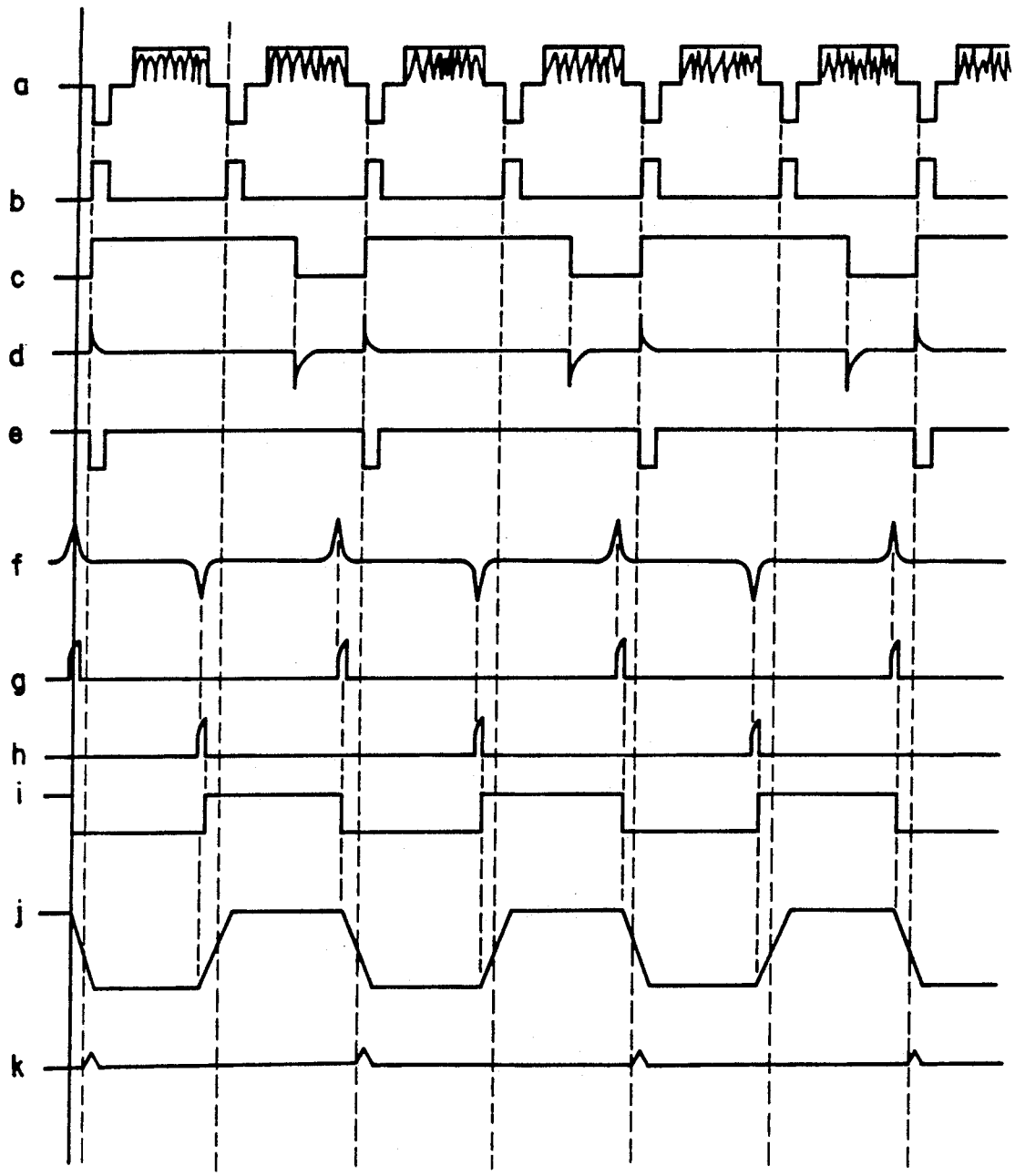
FIG. 4 shows waveforms at various points of the circuit in FIG. 3.

The first part comprises circuit elements that bridge a vertical synchronizing signal separating circuit 20 and A/C head 24. During a recording operation, vertical synchronizing signal (b) is separated from input video signal (a) by vertical synchronizing signal separating circuit 20. Corresponding waveforms of (a) and (b) are shown in FIG. 4. In recording mode, separated vertical synchronizing signal (b) is converted to a square pulse signal (c), each pulse being 23 ms long, by mono-multivibrator 22 shown as MM1). Square pulses (c) are input through a group of functional elements consisting of MM2, an inverter INV1, MM3, MM4, and INV2. Consequently, control pulses are output by the group of functional elements to control A/C head 24.

The second part of drum servo system 200 (FIG. 3) largely comprises phase comparator 26, which essentially measures a positional difference between vertical synchronizing signal (b) and drum pulses (f) generated by drum motor 30.

Square pulses (c) from MM1 22 input to phase comparator 26 are differentiated by the differentiator 28. The positive portion of each of differentiated pulses (d), the portion corresponding to a leading edge of the square pulse, triggers MM5 to generate a sampling pulse (e). It is noted that square pulses (c) are synchronized to vertical synchronizing signal (a), and, therefore, each sampling pulse (e) is synchronized to the leading edge of vertical synchronizing signal (b). Sampling pulses (e) are used as a timing signal for a sample-and-hold 36.

Drum pulses (f) from drum motor 30 are input to MM6 and MM7. MM6 is triggered by positive drum pulses (f) and MM7 is triggered by negative drum pulses (f). MM6 and MM7 work in combination to drive flip-flop 32 to generate approximately 30 Hz head switching signal (i). Head switching signal (i) is input to trapezoidal circuit 34, and trapezoidal circuit 34, in turn, generates trapezoidal pulses (j). The beginning of the leading and the falling edges of a trapezoidal pulse (j) coincides with the leading edge and the falling edges of a single pulse of head switching signal (i).

Trapezoidal pulses (j) are sampled at sample-and-hold 36. The sampled values can be interpreted as error voltages (k): if the drum is operating at normal speed, trapezoidal pulses (j) will arrive with a correct phase and, error voltage (k) will be approximately equal to a nominal value, (i.e., expected value); and if the drum rotates too fast or too slowly, trapezoidal pulses (j) will arrive either advanced or delayed in phase, and error voltage (k) will deviate from the nominal value.

Because sample-and-hold 36 samples when a sampling pulse (e) arrives at its input, sampling pulses (e) control correct timing of the sampling. If trapezoidal pulse (j) arrives advanced in phase (arrives early relative to a sampling pulse (e), sampling pulse (e) will arrive near the front of the declined portion of trapezoidal pulse (j). Consequently, sample-and-hold 36 will sample trapezoidal pulse (j) relatively early, causing decreases in error voltage (k) and a drum driving voltage (not shown, but input to the drum motor). On the other hand, if trapezoidal pulse (j) arrives delayed in phase, sampling pulse (e) will arrive near the back of the declined portion. Consequently, sample-and-hold circuit 36 will sample trapezoidal pulse (j) relatively late, causing increases in error voltage (k) and the drum driving voltage (now shown). Thus, rotational speed of drum motor 30 is regulated for maintaining the constant phase of drum pulses (f). Specifically, the phase of drum pulses (f) is kept at a level such that head switching signal (i) is advanced by 6.5 H±0.5 H ahead of the front edge of vertical synchronizing signal (b). One unit of H is equivalent to 63.5 microseconds.

When the system shown in FIG. 3 is in the playback mode, the phase of head switching signal (i) is controlled in a manner almost identical to that described above for the recording mode. Of course, the switch placed just before MM1 22 is at the PB position, instead of at the REC position as shown.

Figure 6:
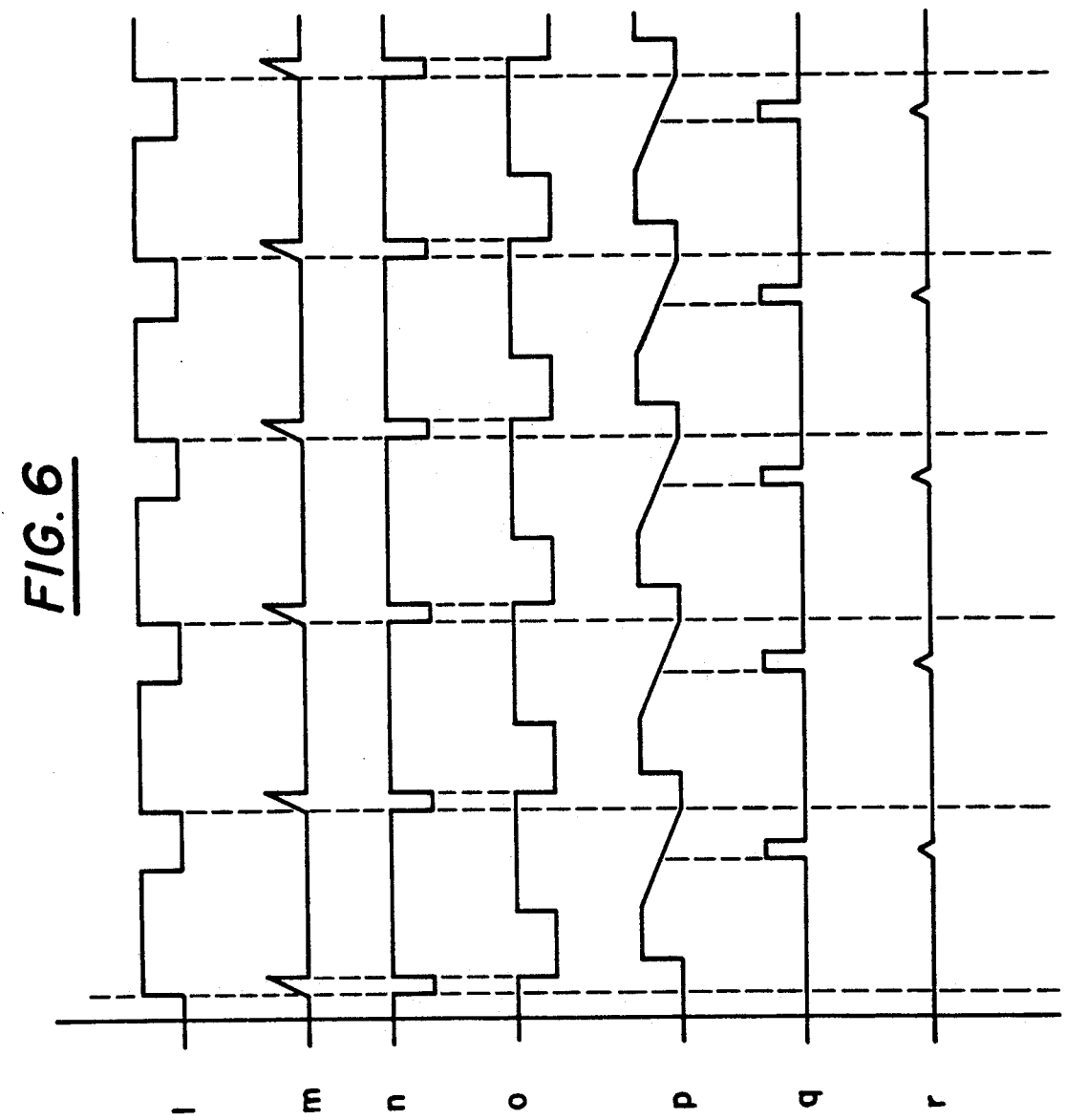
FIG. 6 is a waveform diagram illustrating a capstan phase error signal in the system shown in FIG. 5.

FIGS. 5 and 6 show a conventional capstan servo system 300 of the magnetic recording/reproducing apparatus and waveforms at various points on the system. Capstan servo system 300 can be easily modified as a capstan servo system 300' for use in the circuit of FIG. 7.

During a recording, as shown in FIG. 5, 30 Hz square pulses (1), also shown in FIG.'3 as (c), outputted from MM1 22 are fed to phase comparator 40. Square pulses (1), channeled through an MM8, an inverter INV3, and an MM9, are delayed approximately 1.4 ms (corresponding waveforms at various points in the configuration just described are shown in FIG. 6). Output (o) from MM9 is shaped into trapezoidal pulses (p), each of whose end falling edge coincides with the leading edge of square pulse (1). Trapezoidal pulses (p) are sampled by a sample-and-hold 44 in a similar manner as that described for drum servo system 200 (FIG. 7).

Timing of sampling by sample-and-hold 44 is indirectly controlled by capstan motor 46; a capstan frequency generator coupled to motor 46 outputs a frequency signal (CFG). The signal is reshaped at waveform shaping circuit 48 and directed to a down-converter, to be referred hereinafter as demultiplier 50. Demultiplier 50 down-converts the input signal to generate approximately 30 Hz sampling pulses (q).

Because sample-and-hold 44 samples each trapezoidal pulse (p) when sampling pulse (q) arrives at its input, sampling pulses (q) control correct timing of sampling of trapezoidal pulses (p). The sampled values can be interpreted as error voltages, hereinafter referred to as capstan phase error signal (r), used in a similar manner as error voltage (k) for drum servo system 200 (FIG. 7).

The output of waveform shaping circuit 48 is not only used as an input to demultiplier 50, but is also frequency demodulated (or F-V converted) and routed to an input of comparator 116. Comparator 116 supplies its output to motor driving amplifier 52, which, in turn, controls the rotation of capstan motor 46.

When the system shown in FIG. 5 is in the playback mode, sampling pulses (q) for sample-and-hold 44 are produced by the following steps: feeding the output from A/C head 24 through an INV4 and an MM10; and feeding the output of MM10 to sample-and-hold 44. Also, during the reproduction, instead of using the output from drum servo system 200 (FIG. 7) as its input, phase comparator 40 uses a 30 Hz reference signal.

If the X-distance of A/C head 24 deviates from the nominal value, the phase of reference pulses (y), to be described hereinafter, will also deviate from its nominal phase. Such a deviation is undesirable, because the deviation may also cause a deviation in sampling position of trapezoidal pulses (p) in capstan servo system 300 (FIG. 7), eventually introducing noise in reproduced video signals.

Conventionally, to prevent noise generation, mechanical members, as shown in FIGS. 2A and 2B, are manually adjusted to alter the mounting position of A/C head 24. Such mechanical parts may be eliminated from VTR decks by implementing the circuit shown in FIG. 7.

Figure 8A:
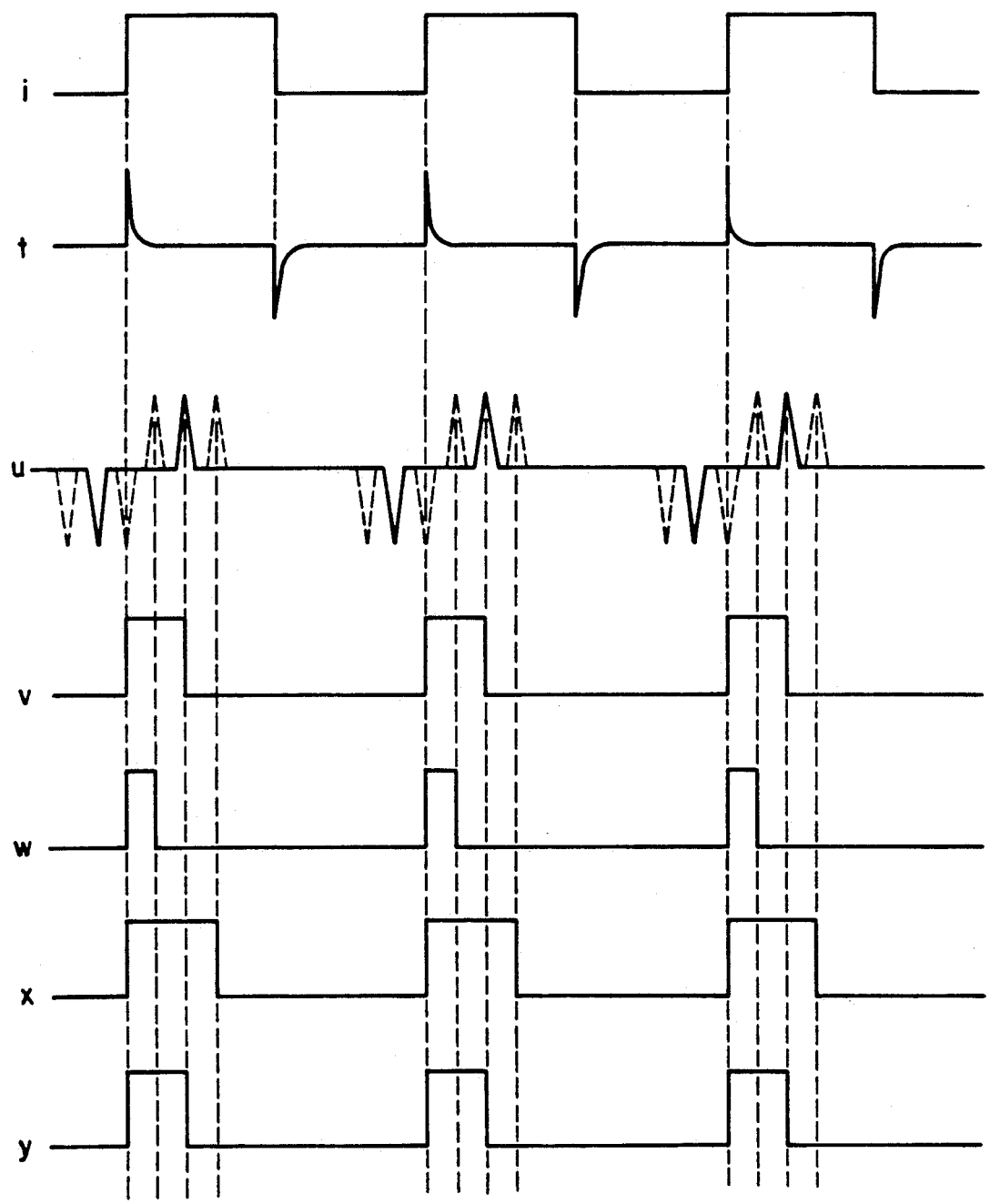
FIGS. 8A and 8B show waveforms at various points on the circuit in FIG. 7.
Figure 8B:
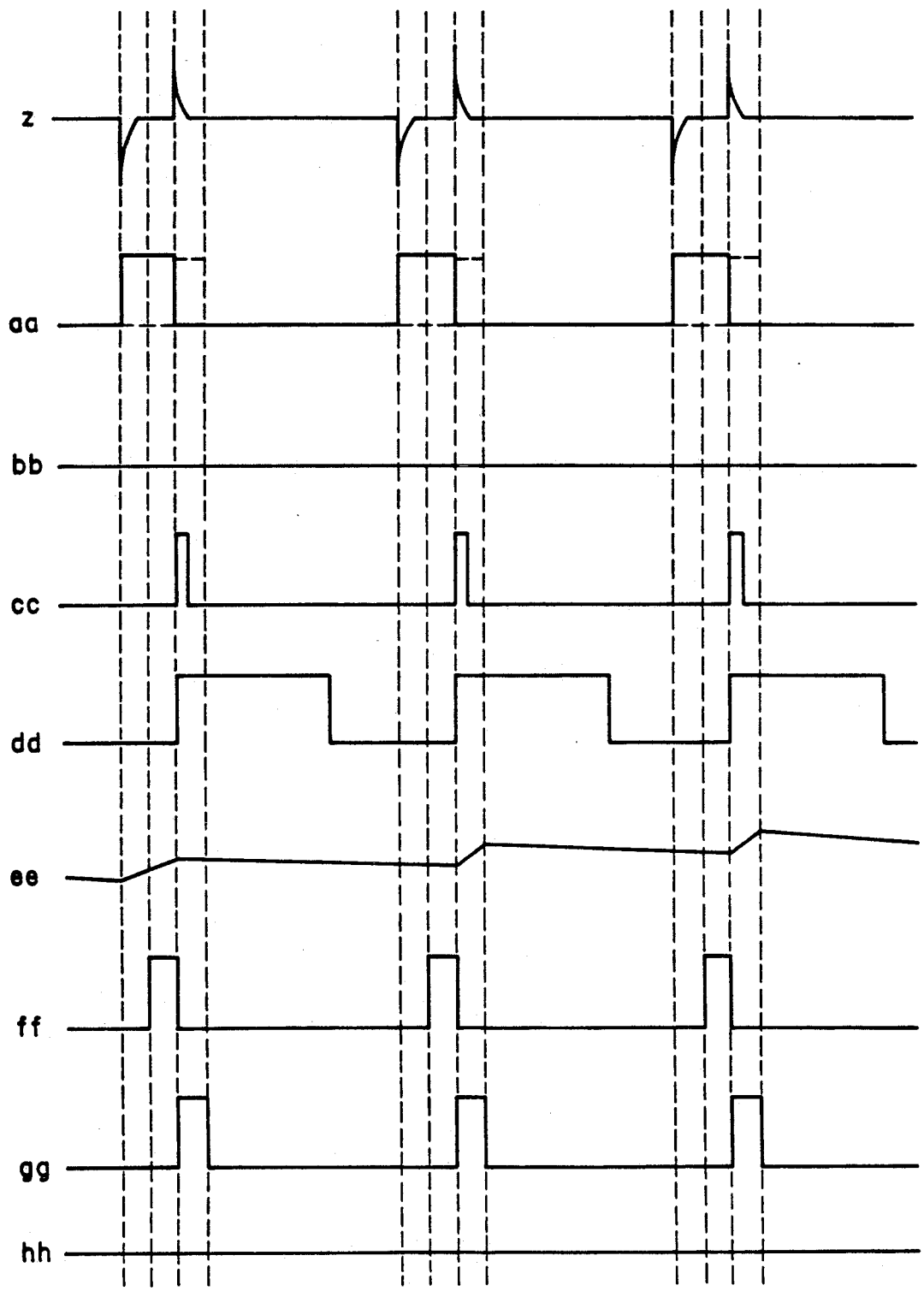

FIG. 7 shows an X-distance compensating circuit of the magnetic recording/reproducing apparatus according to the first embodiment of the present invention. FIGS. 8A and 8B show corresponding waveforms at various points of the circuit in FIG. 7.

Means 70 for generating reference pulses (y) is virtually triggered by head switching signal (s) which is output from drum servo system 200 and differentiated at differentiator 60 and which corresponds to the nominal X-distance. Reproduced control pulses are input from A/C head 24 to amplifier 64, whose output feeds into first delaying means 66 and second delaying means 68. Finally, output (u) from either one of delaying means 66, 68 and output (t) of the differentiator 60 are directed to the inputs of flip-flop 62. Output (t) of differentiator 60 and output (u) of delaying means 66 work in combination to set and reset flip-flop 62, driving flip-flop 62 to generate delay control pulses (v).

Delay control pulses (v) are generated using a first delaying circuit 66 for delaying a control signal picked up at A/C head 24 for a predetermined length of time, and flip-flop 62 for generating pulses each of whose length corresponds to a length of the delay of the reproduced control pulses with respect to reference pulses (y).

Delay control pulses (v, w, or x) output by flip-flop 62 reflects an actual value of the X-distance. Thus, if the X-distance is equal to the above-mentioned nominal distance (79.244 mm in the present embodiment), then the average length of delay control pulses (v) is 6.5 H±0.5 H. If the X-distance is less than the nominal distance, then the average length of delay control pulses (w) will also become less than 6.5 H±0.5 H. Longer delay control pulses (x) will be produced if the actual X-distance is greater than the nominal distance.

Delay control pulses (v) are used, in conjunction with the output from inverter 74, to control proper routing of signals to capstan servo system 300' and to flip-flip 62. One route connects amplifier 64 and first delay circuit 66. Another route involves amplifier 64 and second delay circuit 68.

The routing is accomplished via switches SW2, SW3, and SW4. Position of switch SW3 depends on the output (aa, bb) of detecting circuit 76 which detects a difference between the present and the nominal position of A/C head 24 by taking as its input two signals, output (v, w, or x) of flip-flop 62 and output (z) of inverter 74. Position of other switches SW4 and SW2 are controlled by the output of X-OR gate 82 (FIG. 7) whose inputs are connected to outputs (v, w, or x) of flip-flip 62 and reference pulse generator 70.

In order to control switch SW3, a detection circuit 76 detects the output level of flip-flop 62 as shown in FIG. 7. When the flip-flop output level is logic "low" ("L"), a logic "L" state is output by detection circuit 76, which is shown as detect signal (aa) in FIG. 8B.

Conversely, when the flip-flop level is logic "high" ("H"), a logic "H" state is output by detection circuit 76 and shown as detect signal (bb) in FIG. 8B.

Detect signal (bb), generated in response to a logic "H" from flip-flop 62, is used to trigger mono-multivibrator (MM) 78 to in turn generate square pulses (dd). Square pulses (dd) are then fed to low pass filter 80 to form average direct current signal (ee) shown in FIG. 8B.

Hence, when x-distance is longer than a predetermined nominal distance, this will be indicated by signal (ee) being either logic "H" or logic "L". Switch SW3 will be activated by a logic "H" (ee) signal from low pass filter 80 to directly-couple this signal to first delay circuit 66.

The control of switches SW2 and SW4 is effected by having reference pulses (y) input to one input terminal of X-OR gate 82 and output pulses (v, w, or x) of flip-flop 62 fed to the other input terminal of X-OR gate 82 and having the output signal of low pass filter 84 input to switches SW2 and SW4. Thus, if A/C head 24 is away from its nominal position, X-OR gate 82 produces pulses (ff, gg), which indicate that there is a positional difference between reference pulses (y) and output (v, w, or x) of flip-flop 62.

In other words, an output state of first low pass filter 80, being either "H" or "L," indicates if the X-distance is less or greater than the nominal distance, and output state of second low pass filter 84, being either "H" or "L," indicates whether the X-distance does or does not deviate from the nominal distance. The output signals from first and second low pass filters 80 and 84 are input to the appropriate switches, to control delaying the above-mentioned reproduced control pulses (signals at the point between A/C head 24 and amplifier 64) so that one of the outputs of first and second delay circuits (66, 68) is synchronized to reference control pulses (y).

In summary, the X-distance compensating circuit of FIG. 7 functions as follows. If A/C head 24 is positioned such that the X-distance is less than the nominal value, then the phase of the reproduced control pulse will advance until its phase matches that of a reference signal (y, corresponding to the nominal X-distance). In these circumstances, output (ee) of first low pass filter 80 becomes logic "L" and the output of second low pass filter 84 becomes logic "H," followed by switch SW2 turning on to drive first delay circuit 66 to shift the phase of the reproduced control pulses to the nominal phase. Thus, if the X-distance is shorter than the nominal value, then the reproduced control signal is phase-shifted to properly control capstan servo system 300'. At the same time, switch SW3 is turned off as a logic "L" signal is fed through inverter 86.

If A/C head 24 is positioned such that the X-distance is longer than the nominal distance, then outputs of first and second low pass filters 80 and 84 become logic "H,"

with both switches SW3 and SW4 being turned on to provide a route from second delay circuit means 68 to capstan servo system 300.

It is noted that a reproduced audio signal which is picked up by A/C head 24 and then fed to audio processor 400 can be muted by switch SW1 being turned-off by output value logic "L" from second low pass filter 84.

FIG. 9 shows a second embodiment of the present invention comprising another X-distance compensating circuit. In FIG. 9, output pulses (i) of flip-flop 32 of a drum servo system 200 as in FIG. 7 are input to microprocessor 90, and microprocessor 90 measures the delay of each pulse (i), starting from the leading edge of each pulse (i). If the reproduced control pulse (FIG. 7, between A/C head 24 and amplifier 64) lies within 6.5 H±0.5 H off an edge of a pulse (i), then microprocessor 90 drives first delay circuit 92 to delay the reproduced control pulses. On the other hand, if each reproduced control pulse occurs after 6.5 H±0.5 H of off each pulse, then microprocessor 90 drives second delaying circuit 94 to delay the reproduced control pulse by 33.33 ms in order to supply an output to a capstan servo system 300' as in the embodiment of FIG. 7. In addition, if the phase of the reproduced control pulse is advanced or lagged with respect to the nominal phase, microprocessor 90 forces switch 96 to cut off audio signals input to audio processor 98.

In the two embodiments of an X-distance compensating circuit described above, automatic adjusting of the X-distance of A/C head 24 is effected by way of feedback circuits. Even if an attached position of A/C head 24 is such that the X-distance is not approximately equal to the nominal distance, capstan servo system 300' (FIG. 7) can be properly driven by the X-distance compensating circuits of the present invention. Thus, manual X-distance adjusting members, as shown in FIGS. 2A and 2B, can be removed from a VTR deck if one of the X-distance compensating circuits is properly connected to capstan and drum servo systems 200, 300' (FIG. 7).

Figure 10:
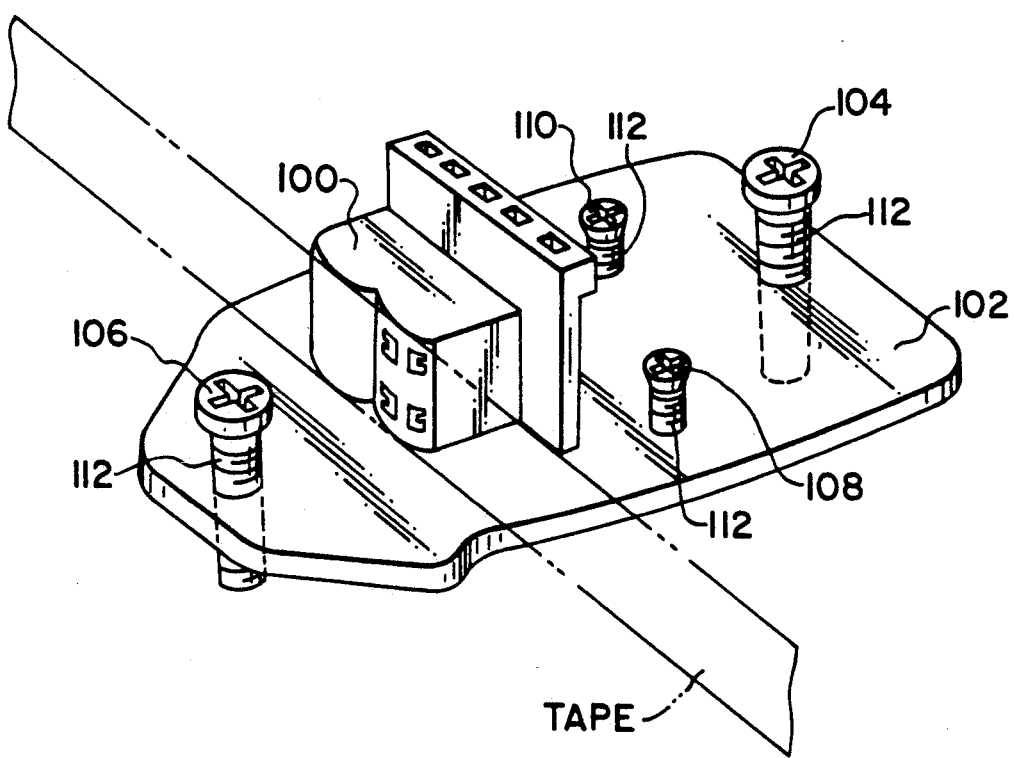
FIG. 10 a side elevational perspective view of an A/C head support structure of the magnetic recording/reproducing apparatus according to the present invention.

FIG. 10 is a perspective view of an A/C head supporting structure using one of the X-distance compensating circuits of the present invention. In FIG. 10, A/C head 100 is mounted on A/C head base 102, and A/C head base 102 is secured to a deck by four screws. Screw 104 at the rear of A/C head 100 adjusts the height and the tilting angle of A/C head 100. Two side screws 108 and 110 are used for adjusting azimuthal angle of A/C head 100. Each of elastic members 112 (e.g., springs) may be placed between the head of each of screws 108, 110 and A/C head base 102 to increase fixing forces of the screws.

Compared to the conventional structure shown in FIGS. 2A and 2B, the structure in FIG. 10 comprises neither a rotatable A/C head base holder nor parts for manually adjusting the X-distance. A/C head 100 of the present embodiment forms a compact structure, requiring fewer parts, fewer man-hours to assemble, and less containment space to construct. Such a structure can help lower its production cost and improve the quality of VTR decks.

Although only a few exemplary embodiments of this invention have been described in detail above, those skilled in the art will readily appreciate that many modifications are possible in the preferred embodiments without materially departing from the novel teachings and advantages of this invention. Accordingly all such modifications are intended to be included within the scope of this invention as defined by the following claims.

I claim:

1. A magnetic recording/reproducing apparatus comprising:
    a drum;
    a capstan;
    an audio/control head for reading audio and control signals from a magnetic tape and generating reproduced control pulses in response thereto;
    a drum servo system generating head switching pulses and including means for controlling the speed of the drum;
    a capstan servo system for controlling the capstan;
    a deck on which the drum and the audio/control head are either indirectly or directly mounted; and
    an x-distance compensating circuit for electrically adjusting a relative x-distance to a nominal x-distance during recording or reproduction of signals to/from the magnetic tape, the relative x-distance being defined as a function of the length of the magnetic tape with respect to a fixed point on the drum and a point on the audio/control head which the magnetic tape traverses, said x-distance compensating circuit comprising:
    a reference pulse generating means for generating reference pulses in response to head switching pulses generated by said drum servo system, said reference pulses corresponding to the nominal x-distance of the magnetic tape at each point in time when said audio/control head generates said reproduced control pulses;
    delay means responsive to said reproduced control pulses from said audio/control head and a delay control signal for generating delayed reproduced control pulses, said delayed reproduced control pulses being transmitted to the capstan servo system for controlling the speed of the capstan in accordance therewith; and
    comparator means responsive to said reference pulses from said reference pulse generating means and said delayed reproduced control pulses from said delay means to generate the delay control signal to said delay means.

2. An apparatus as in claim 1, wherein each of said reference pulses has a pulse-width of 6.5 H±0.5 H, one unit of H being approximately equal to 63.5 microseconds.

3. An apparatus as in claim 1, wherein said comparator means includes:
    means for discriminating between an early arrival and a late arrival of delayed reproduced control pulses relative to said reference pulses and detecting when said delayed reproduced control pulses from said delay means are substantially not synchronized to said reference pulses.

4. An apparatus as in claim 3, wherein said delay means includes an early arrival delaying means responsive to the delay control signal for delaying the reproduced control pulses input thereto by an amount which value is a function of a falling edge of each of said reference pulses when said discriminating means detects an early arrival of the inputted delayed reproduced control pulses.

5. An apparatus as in claim 3, wherein said delay means includes a late arrival delaying means responsive to the delay control signal for delaying the reproduced control pulses input thereto by 33.33 ms when said discriminating means detects a late arrival of the inputted delayed reproduced control pulses.

6. An apparatus as in claim 1, wherein said delay means includes first delaying means responsive to the delay control signal for delaying the reproduced control pulses by an amount which value is a function of a falling edge of each of said reference pulses during an early arrival of said delayed reproduced control pulses to said comparator means.

7. An apparatus as in claim 1, wherein said delay means includes a late arrival delaying means responsive to the delay control signal for delaying the reproduced control pulses input thereto by 33.33 ms during a late arrival of said delayed reproduced control pulses to said comparator means.

8. An apparatus as in claim 1, wherein at least one of said reference pulse generating means and said comparator means are under microprocessor programmed control.

9. An apparatus as in claim 1, wherein said audio/control head is supported by a structure including:
 a base for securing said audio/control head;
 a height adjusting screw for adjusting the height of said base;
 a tilt screw for adjusting the tilt angle and the height of said base, said tilt screw being placed diagonally with respect to said height adjusting screw; and
 two screws for adjusting the azimuth of said base.

10. An apparatus as in claim 9, wherein an elastic member is placed between each of said screws and said base.

* * * * *